Oct. 1, 1935.  T. M. THOMAS  2,015,823
DIRECT CONNECTED IMPLEMENT
Filed Feb. 13, 1933  2 Sheets-Sheet 1

Inventor
Thomas M. Thomas
By Lyon & Lyon
Attorneys

Patented Oct. 1, 1935

2,015,823

UNITED STATES PATENT OFFICE 2,015,823

DIRECT CONNECTED IMPLEMENT

Thomas M. Thomas, Huntington Park, Calif., assignor to Killefer Manufacturing Corporation, Ltd., Los Angeles, Calif., a corporation of California Application February 13, 1933, Serial No. 656,420

2 Claims. (Cl. 97—47)

This invention relates to direct connected implements and more particularly to an implement adapted for direct connection with a tractor for cultivating the soil and which implement is so constructed as to provide for a relatively high degree of clearance between its supporting frame and the soil when in operation and which is so coupled to the tractor as to reduce the tendency imposed upon a tractor by the direct coupling of a tool thereto to rear up.

Other objects and advantages of this invention it is believed will be apparent from the following detailed description of a preferred embodiment thereof as illustrated in the accompanying drawings.

Figure 1:
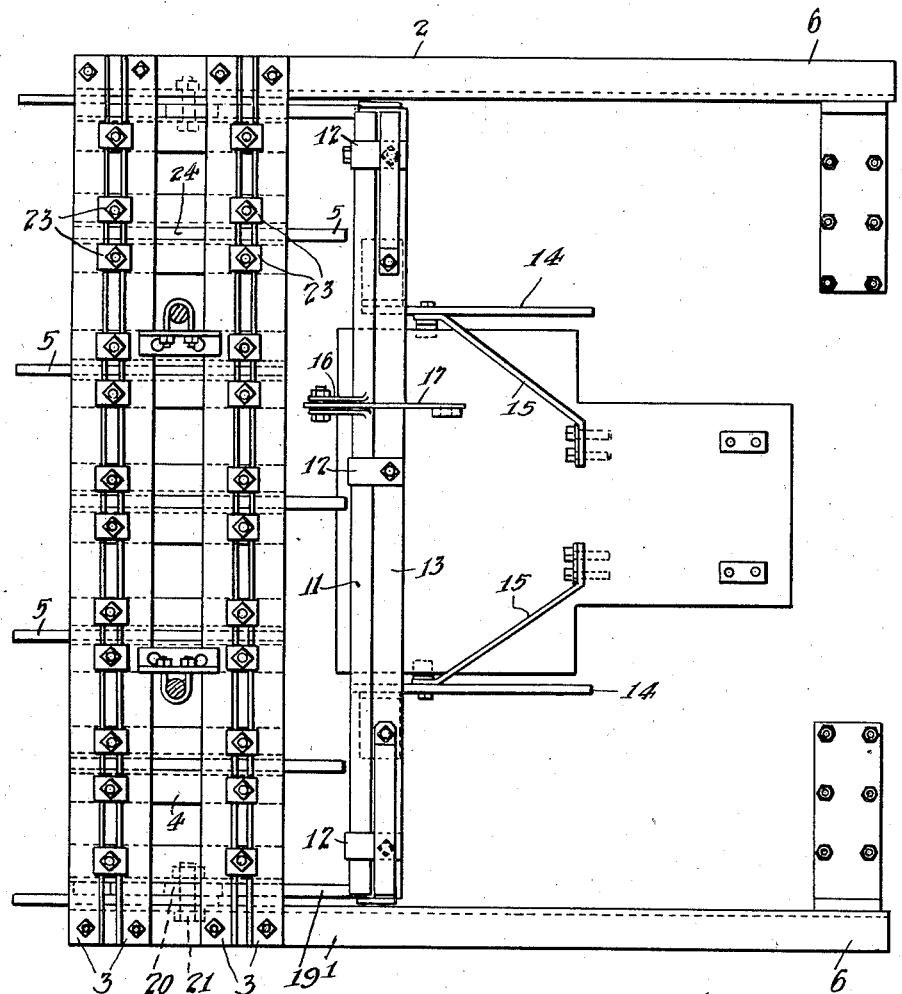
Figure 1 is a top plan view of a direct connected implement embodied in my invention.
Figure 2:
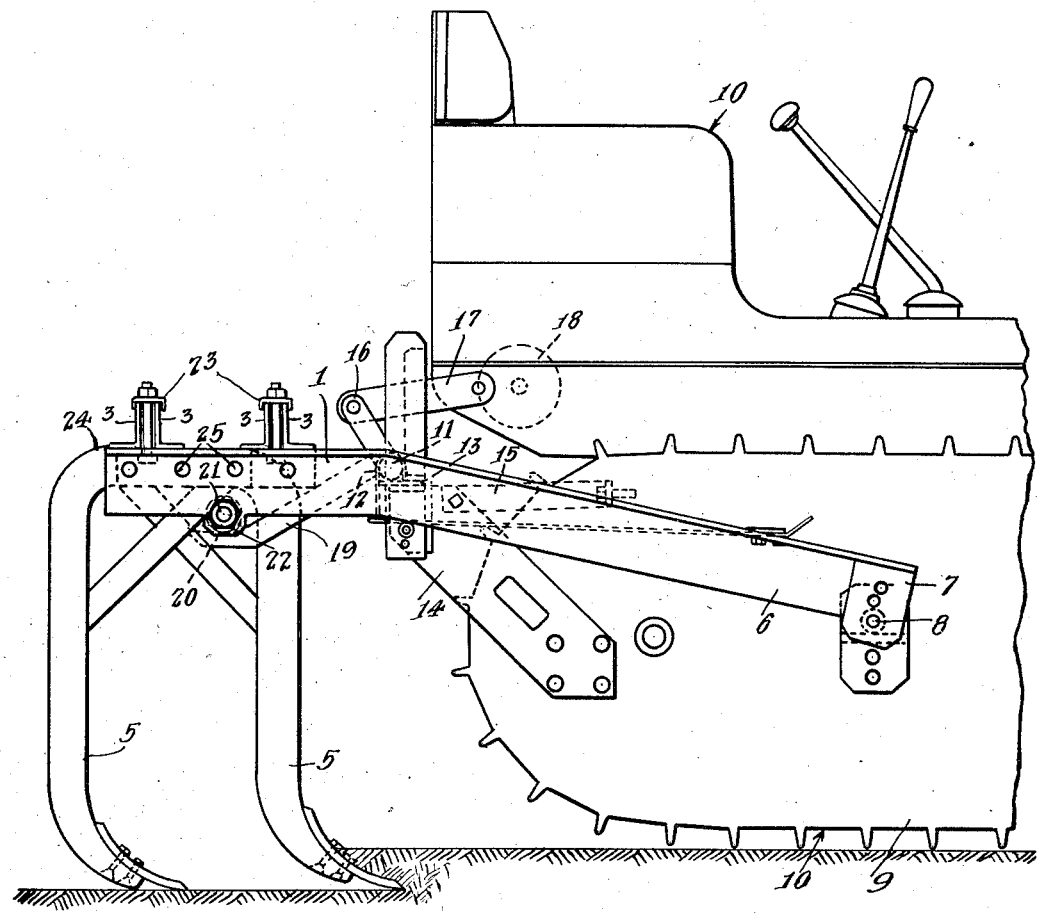
Figure 2 is a side elevation thereof illustrating the direct connected tool as coupled with a portion of the tractor.

In the preferred embodiment of my invention illustrated in the accompanying drawings, 1 indicates a frame which is composed of side members 2 connected together by angles 3. The angles 3 are connected together at points spaced along their length by means of tool supporting angles 4 secured transversely of the angles 3 in pairs at the points where it is desired to secure the ground-working tools 5. The side arms 2 of the frame 1 are bent downwardly to provide opposed attachment arms 6 which extend downwardly and are pivotally secured by means of brackets 7 to pivots 8 carried within the track 9 of the tractor 10. There are thus provided means for pivotally connecting the forward end of the attachment arms to the tractor.

Means are provided for lifting the frame 1 relatively to the ground which means preferably includes a rock shaft 11 which is pivotally supported in spaced bearings 12 carried by a transversely extending bar 13 supported in position by means of end plates 14 which are secured at one end to the bar 13 and at their opposite ends are secured to the frame of the tractor. The rock shaft 11 is mounted between the frame 1 and the power take-off 18 of the tractor 10.

Braces 15 connect with the plates 14 and braces 15 are likewise secured to the stationary portion of the frame of the tractor. Welded to the rock shaft 11 are lift arms 16 to which lift arms 16 a lifting link 17 is pivotally connected at one end. The lifting link 17 is at its opposite end pivotally connected to the lifting arm of a power take-off diagrammatically illustrated at 18 which is provided in connection with several forms of tractors. The structure of the lift mechanism 18 is well understood in the art so that it need not be specifically described here.

Secured to the shaft 11 are lifting arms 19 which extend under the frame 1 to engage a roller 20 carried by a bolt 21 and lifting brackets 22. The lifting arms 19 at their point of contact with the rollers 20 are bent so that the engaging surface thereof is substantially horizontal, permitting a relatively moving contact between the rollers 20 and the horizontal portion of the lifting arms 19 as the frame 1 is elevated to the actuation of the lift mechanism 18.

In order to brace the frame structure, clips 23 are provided along the angles 3. The shanks 24 of the ground-working tools 5 are secured to the frame 1 by means of bolts 25 which are passed through holes formed in the ends of the shanks 24 and through the downwardly depending flanges of the angles 4.

Having fully described my invention, it is to be understood that I do not wish to be limited to the details herein set forth, but my invention is of the full scope of the appended claims.

I claim:

1. In a direct connected cultivating implement for connection with a tractor having a power take-off, a frame including side arms which extend forwardly and downwardly to provide attachment arms, angles mounted between the arms in pairs to connect said arms, ground-working tool-supporting angles mounted in pairs and connected between the first said angles of the ground-working tools, means for securing the ground-working tools between pairs of the latter said angles, and a lift structure supported between the frame and the tractor, and means connecting the lift structure with the frame and with a power lift of the tractor.

2. In a cultivating device adapted to be directly connected with a tractor having a power take-off, the combination of a frame, a cultivating tool supported by the frame, attachment arms extending forwardly from the frame, means for pivotally connecting the attachment arms with the tractor to permit vertical swinging movement of the frame relative to the tractor, a rock shaft, means for pivotally supporting the rock shaft from the tractor between the power take-off and the said frame, brace means connecting the rock shaft supporting means with the tractor, a lifting arm secured to the rock shaft, a lifting link connecting the lift arm and the power take-off to rock the rock shaft as the power take-off is operated, lifting arms secured in spaced relation to the rock shaft and operatively engaging the said frame to lift the frame vertically relative to the tractor as the rock shaft is rocked, and rollers interposed between the said frame and the latter said lifting arms.

THOMAS M. THOMAS.